No. 897,062. PATENTED AUG. 25, 1908.
F. B. COOK.
CABLE TERMINAL.
APPLICATION FILED JUNE 28, 1907.

2 SHEETS—SHEET 1.

WITNESSES: Frederick R. Parker
Harry B. Davis.

INVENTOR: Frank B. Cook.

No. 897,062.

F. B. COOK.
CABLE TERMINAL.
APPLICATION FILED JUNE 28, 1907.

PATENTED AUG. 25, 1908.

2 SHEETS—SHEET 2.

WITNESSES:
Frederick R. Parker.
Harry B. Davis.

INVENTOR:
Frank B. Cook.

UNITED STATES PATENT OFFICE.

FRANK B. COOK, OF CHICAGO, ILLINOIS.

CABLE-TERMINAL.

No. 897,062.  Specification of Letters Patent.  Patented Aug. 25, 1908.

Application filed June 28, 1907. Serial No. 381,358.

*To all whom it may concern:*

Be it known that I, FRANK B. COOK, a citizen of the United States of America, residing at Chicago, in the county of Cook and State of Illinois, have invented a new and useful Cable-Terminal, of which the following is a specification, reference being had to the accompanying drawings illustrating same.

My invention relates to cable terminals used in connection with telephone, telegraph or other electrical cables, for the purpose of distributing the conductors of the cables and for protecting same against injurious electricity of various forms.

The principal objects of my invention are to provide a cable terminal having an air-tight and moisture-tight distributing box for the cable conductors, and fanning strips for the aerial conductors leading to the terminal, all constructed of formed sheet metal; to provide a suitable cover for such a cable terminal and improved means for supporting the cover and holding same in place whether it is pulled down over the terminal or partially raised; to provide improved means for carrying the cable conductors out through the sides of the inclosed distributing box of the terminal and for securing the said conductors to suitable connecting posts or terminals; and to provide general improvements in the construction of such a cable terminal.

Other objects will be apparent from the following specification.

Figure 1:
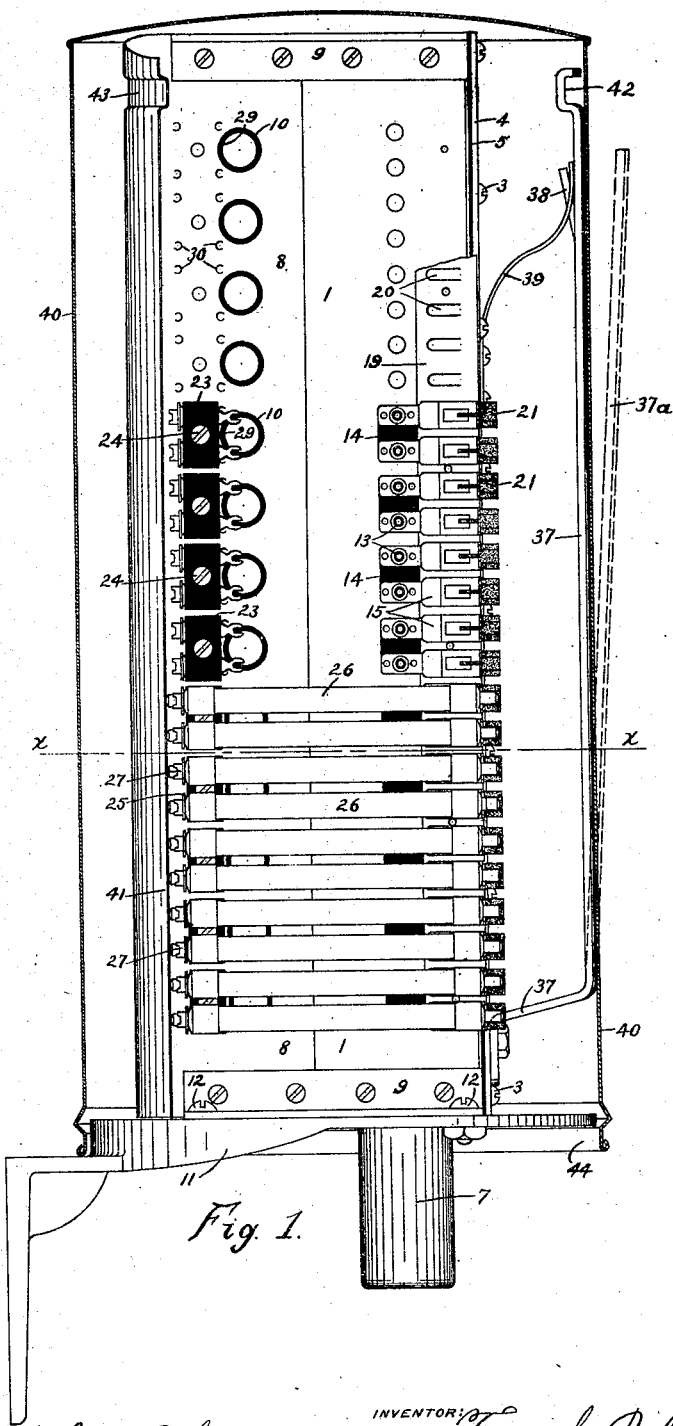
Figure 2:
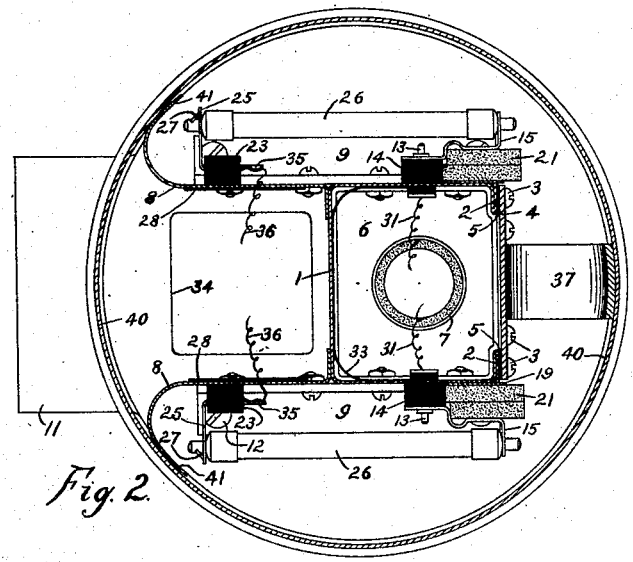
Figure 3:
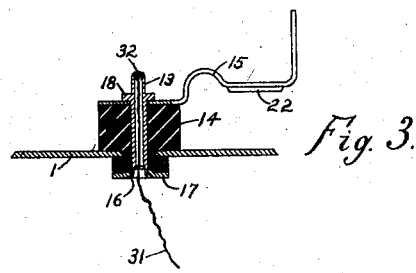

In the accompanying drawings, Figure 1 is a side elevation of the preferred form of cable terminal of my invention, with portions of the protective apparatus removed and the cover for the terminal shown in vertical cross-section; Fig. 2 is a transverse cross-sectional view of the cable terminal shown in Fig. 1, taken on line $x\ x$ of Fig. 1; and Fig. 3 is a detail cross-sectional view of one of the distributing posts of the terminal, showing the method of carrying a cable conductor through the post to the outside of the inclosed box of the terminal, and of securing the said conductor to the post; and also showing the method of mounting the hollow post and a spring contact member to the side of the inclosed box of the terminal and insulating the said post from the box.

Like figures of reference refer to like parts in the several figures of the drawings.

The inclosed box portion of the terminal is constructed of a piece of sheet metal 1, formed as three sides of the box portion and having its edges folded back as at 2 2 to stiffen same and to provide an increased thickness for screws 3 3 which secure the front plate 4 to the box portion 1 to close the latter and thereby form an air-tight and moisture-tight box for the cable to enter. The joint between the portions 2 2 and the front plate 4 is kept air and moisture-tight by means of a gasket, preferably of rubber, interposed between the parts 2 and 4. The ends of the box portion are suitably closed by suitable metal portions 6 6, the lower end portion 6 having a suitable nozzle 7 extending therethrough to accommodate the cable leading to the inclosure of the box portion. The nozzle 7 is preferably of the self-soldering type which is well understood without further description. To the rear of the box portion 1 are secured sheet metal fanning strips 8 8 by angle irons 9 9 at the ends of box portion 1, the fanning strips 8 8 being preferably formed as shown and provided with holes 10 10 therethrough for accommodating aerial conductors leading to the terminal. The box portion 1 and the fanning strips 8 8 are mounted on a suitable mounting bracket or base 11 by bolts 12 12.

The metal portions 1, 6, 6, 7, 9, 9, 8, 8, and 11 are preferably all assembled as shown in the drawings and then galvanized as a whole, the galvanizing tightly sealing the joints between the box portion 1 and the end portions 6 6.

On each of two opposite sides of the box portion 1 is mounted a series of hollow connecting posts 13 13 extending through the side of the box portion 1 and insulated therefrom preferably as shown, each binding post carrying a spring member 15 on its outer end and having its inner end 16 riveted over against a metal washer 17 so as to securely hold all of the parts together as shown in Fig. 3. The shoulder 18 on each binding post 13 is preferably soldered to its spring member 15 so as to do away with any pressure contact in the circuit which will be hereinafter traced through these parts. A ground strip 19 is secured to box portion 1 near the front edge thereof, on each of the said opposite sides of the box portion 1. Each ground strip 19 is preferably provided with tongue portions 20 20 adapted to fit in grooves of the lightning arresters 21 21 to hold the latter in place. Each spring member 15 is also provided with an inner projecting portion 22 adapted to fit in a groove of a lightning arrester to hold the latter in place. The lightning arresters 21 21, each preferably comprising the usual carbon blocks with interposed dielectric, are inserted between the ground strip 19 and the springs 15 15, as shown in the drawings. On each fanning strip 8 is mounted a series of blocks of insulation 23 23 by bolts 24 24, each block 23 carrying a pair of springs 25 25 which are forcibly inserted therethrough preferably as shown in the drawings. Each inclosed or tubular fuse 26 is carried by one spring 25 and one spring 15, one terminal of the fuse being inserted through a hole in spring 25 and then depressed against a projection 27 which places the fuse under a leverage or binding stress, the other terminal of the fuse then being inserted into a slot in the free end of spring 15 which is adapted to firmly grip the terminal of the fuse 26 and thereby securely hold the latter in place. Each fanning strip 8 is provided on its inner surface with a strip of insulation 28 having holes 29 29 therein concentric with holes 10 10 in strip 8 but somewhat smaller than holes 10 10 so as to insulate conductors passing through holes 10 10, from the sheet metal strip 8. Each block of insulation 23 is held against turning on strip 8 by projections 30 30 thereon formed preferably as shown. The cable conductors 31 31 extend from the inclosure of box 1 through hollow posts 13 13 as shown in Fig. 3, and are soldered to the outer ends of posts 13 13 at 32 32; the solder sealing the holes in the posts 13 13. By thus soldering the conductors 31 31 on the outside of the box 1 the latter may be made much smaller than where the soldering is done within the box 1. A much better job can be done where the soldering is done as shown in Fig. 3. A thin sheet of fiber 33 is placed within the box portion 1 as shown in Fig. 2, so as to provide an insulating surface or lining for the box portion to protect the cable conductors 31 31 from the metal part 1. When it is desired to distribute the cable conductors 31 31 through the hollow posts 13 13, the front cover 4 of the box portion may be readily removed to permit of access to the interior of the box 1.

The electrical conductors 36 36 leading to the cable terminal extend up through the base plate 11 through a hole 34 therein and thence through holes 29 29 and 10 10 to the connection terminals 35 35 of springs 25 25.

With the construction above described, the circuit of a cable conductor 31 is extended through a hollow post 13, spring 15, inclosed fuse 26, spring 25, and terminal 35, to a conductor 36 which extends to the aerial circuit.

The base plate 11 is preferably connected to ground to provide a ground connection from ground strips 19 19 for the lightning arresters 21 21. The functions of the inclosed fuses 26 26 and lightning arresters 21 21 in the arrangement herein shown are well understood and it is not thought to be necessary to go into a detailed description of their uses as protective devices for the cable conductors.

At the lower end of the front plate 4 is secured a stiff spring member 37 preferably formed as shown in Fig. 1 and having a tongue portion 38 thereon near its upper end. Toward the upper end of the front plate 4 is secured another spring member 39 which bears against the spring member 37 preferably as shown the tongue portion 38 projecting through the outer end of spring member 39. A cylindrical sheet-metal cover 40 is placed over the terminal as a whole, preferably as shown in the drawings, it bearing against edge portions 41 41 of fanning strips 8 8, and the spring member 37, all of which form supports for the cover 40, the spring member 37 being under tension from itself and from spring 39 which securely holds the cover 40 to the portions 41, 41 and 37, and at the same time permits of the cover 40 being raised any desired amount. When the cover 40 is entirely removed from the terminal the spring 37 takes the position 37ᵃ shown in dotted lines in Fig. 1. When it is desired to place the cover 40 over the terminal, the spring 37 is pressed from the position 37ᵃ to the position 37 whence the cover 40 may be readily lowered over the terminal. When it is desired to raise the cover 40 so as to expose the whole terminal, it is raised until the rim 44 thereof rests in the notch 42 in spring 37 and in the recesses 43 43 in fanning strips 8 8, the spring 37 holding the cover 40 in this position and thereby eliminating the necessity of entirely removing the cover from the terminal. Now if it is desired to either entirely remove the cover 40 from the terminal or lower it over the latter, the front spring 37 is pressed inwardly whereupon the cover 40 may be readily moved either up or down.

It will readily be seen that the construction above described provides a very light cable terminal and a cable terminal which is very strong and readily accessible at all portions. Such a cable terminal is also fireproof as it is constructed almost entirely of metal.

I do not wish to limit this invention to all of the particular details of construction as herein shown or described, as many modifications may be made therein without departing from the scope of the appended claims.

What I claim as new and desire to secure by Letters Patent, is:

1. A cable terminal of the character described comprising a head for accommodating the cable conductors; a cover for the terminal adapted to be placed over same, a substantially vertical support for the cover secured to the head near its lower end, and a spring member near the upper end of the said support adapted to press the latter out against the said cover to hold same in whatever position it may be placed relatively to the terminal.

2. A cable terminal of the character described comprising a head for accommodating the cable conductors, a cover for the terminal adapted to be placed over same, a support for the cover extending substantially parallel with the head and mounted near one end of the latter, a spring member carried by the head and bearing against the said support to press the latter out against the cover to support same in whatever position it may be placed, a rim near the open end of the cover, and a notch on the said support near the free end thereof adapted to engage the said rim when the cover is raised to expose substantially the whole terminal head, to firmly hold the said cover in such raised position.

3. A cable terminal of the character described comprising a vertically arranged inclosed head for accommodating the cable conductors, having a removable side, a vertically arranged support carried by the said removable side near one end thereof, a spring member carried by the said removable side and adapted to bear against the said support to press the free end of the latter away from the head, and a cylindrical cover for the cable terminal as a whole adapted to be pulled down over the terminal, the said support holding the said cover in place whether the latter is pulled down over the terminal or partially raised.

4. A cable terminal of the character described comprising a sheet-metal box portion having the front thereof removable, a cover for the terminal as a whole, sheet-metal fanning strips extending from the rear of the box portion and having their edges formed to bear against the said cover, a spring support for the cover carried by the removable side of the box portion, and series of protective devices mounted on the said box portion and fanning strips.

5. A cable terminal of the character described comprising a mounting base, a sheet-metal box portion mounted on the said base, sheet-metal fanning strips extending from the said box portion, series of protective apparatus mounted on the said box portion and on the fanning strips, the said fanning strips having holes therethrough for accommodating conductors leading to the protective apparatus, and a strip of insulation carried by each fanning strip and having holes therein concentric with the said holes in the fanning strips but smaller than the latter said holes to insulate the said conductors from the fanning strips where they pass through same.

6. A cable terminal comprising a moisture-tight box portion having a removable side, fanning strips extending from the said box portion, series of hollow connecting posts extending through the sides of the box portion, conductors extending from the interior of the box portion through the said hollow posts and soldered at the outer ends of the latter so as to seal the openings in the said posts, series of spring members carried by the said posts, series of spring members suitably mounted on the said fanning strips, and series of fuses and lightning arresters carried by the said spring members.

As inventor of the foregoing I hereunto subscribe my name in the presence of two subscribing witnesses this 24th day of June, 1907.

FRANK B. COOK.

Witnesses:
HARRY B. DAVIS,
FREDERICK R. PARKER.